United States Patent [19]

Stapp

[11] Patent Number: 4,480,692

[45] Date of Patent: Nov. 6, 1984

[54] PHOSPHORUS CONTAINING ESTER COSURFACTANTS IN ENHANCED OIL RECOVERY PROCESSES

[75] Inventor: Paul R. Stapp, Bartlesville, Okla.

[73] Assignees: Phillips Petroleum Company, Barlesville, Okla.

[21] Appl. No.: 437,084

[22] Filed: Oct. 27, 1982

[51] Int. Cl.³ .............................................. E21B 43/22
[52] U.S. Cl. .................................... 166/273; 166/274; 252/8.55 D; 252/353
[58] Field of Search ...................... 252/8.55 D, 8.55 B, 252/363.5, DIG. 14, DIG. 17, 353; 166/273, 274, 275

[56] References Cited

U.S. PATENT DOCUMENTS

| | | | |
|---|---|---|---|
| 2,356,205 | 8/1944 | Blair et al. | 252/8.55 |
| 3,366,174 | 1/1968 | Ferrell et al. | 252/8.55 X |
| 3,373,809 | 3/1968 | Cooke | 252/8.55 X |
| 3,480,083 | 11/1969 | Oleen | 166/275 |
| 3,508,611 | 4/1970 | Davis et al. | 252/312 X |
| 3,964,548 | 6/1976 | Schroeder et al. | 166/273 |
| 4,013,125 | 3/1977 | Plummer et al. | 166/273 |
| 4,079,785 | 3/1978 | Hessert et al. | 166/273 |
| 4,266,610 | 5/1981 | Meister | 166/273 |
| 4,295,980 | 10/1981 | Motz | 252/8.55 |
| 4,335,787 | 6/1982 | Stapp | 252/8.55 |

FOREIGN PATENT DOCUMENTS 151039 4/1953 Australia .............................. 252/353

Primary Examiner—Herbert B. Guynn

[57] ABSTRACT

A surfactant system useful for oil recovery consisting essentially of a surfactant, such as a petroleum sulfonate, and at least one cosurfactant selected from the group consisting of a phosphate ester of the formula:

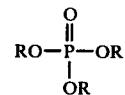

and a phosphite ester represented by the formula

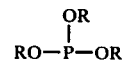

and a phosphonate ester represented by the formula

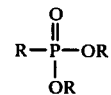

wherein R is either a methyl, ethyl or propyl group.

9 Claims, No Drawings

PHOSPHORUS CONTAINING ESTER COSURFACTANTS IN ENHANCED OIL RECOVERY PROCESSES

This invention relates to surfactant systems. More specifically, this invention relates to the use of new surfactant systems for oil recovery.

Waterflooding and surfactantflooding are processes well known in the art to recover vast quantities of oil which remain in the formation after primary oil recovery. In the case of surfactantflooding, it is not uncommon to employ a cosurfactant wherein the latter aids in forming microemulsions with the oil to be recovered.

The oil recovery effectiveness of surfactant systems though, can be diminished by the presence of a highly saline environment (i.e., greater than 2 weight percent total dissolved solids) in the waters associated with the oil to be recovered. This is because highly salinity solutions can cause precipitation of surfactants and hence destroy their effectiveness in the oil recovery process. A highly saline environment can also diminish the effectiveness of mobility buffers by reducing their viscosity. Therefore, it is highly desirable to develop surfactant systems which are effective in highly saline environments.

It is therefore an object of this invention to provide a surfactant system comprising a surfactant and cosurfactant which are effective for tertiary oil recovery even in highly saline environments. A further object of this invention is to provide a surfactantflooding process which enhances tertiary oil recovery.

These and other objects, advantages, details, features and embodiments of this invention will become apparent to those skilled in the art from the following detailed description of the invention and the appended claims.

In accordance with this invention it has been found that certain phosphorus containing esters can be efficiently used as cosurfactants in surfactantflooding operations for oil recovery.

Thus, in accordance with a first embodiment of this invention, there is provided a new surfactant system consisting essentially of a hydrocarbon sulfonate surfactant and a phosphorus containing ester as a cosurfactant.

SURFACTANT SYSTEM

The preferred surfactant system of this invention is an aqueous system, optionally containing a protective agent. Generally, water is used containing a certain quantity of sodium chloride for practical reasons. Typical and preferred compositions of a surfactant system of this invention are shown in the following table:

TABLE I

| Ingredient | Broad Range | Preferred Range |
| --- | --- | --- |
| Water (parts by wt.) | 100 | 100 |
| Hydrocarbon Sulfonate* (active parts by wt.) | 0.1–15 | 1–12 |
| Ester (parts by wt.) | 0.05–15 | 1–7 |
| Protective Agent (parts by wt.) | 0.01–3 | 0.05–2 |
| NaCl (parts by wt.) | 0–10 | 0.1–8 |

*The ranges for the active hydrocarbon sulfonate (e.g. petroleum sulfonate) in parts by weight. The "active" value is readily determined by multiplying parts by weight used and the fraction of active ingredients in the product.

SURFACTANT

The surfactant used in the surfactant system of this invention is a hydrocarbon sulfonate. It can be made from relatively pure hydrocarbons and hydrocarbon mixtures. The preferred surfactant is a petroleum sulfonate. The petroleum sulfonates are commercially available products. The presently preferred surfactants used in oil recovery are petroleum sulfonates having an average equivalent weight in the range of 325 to 600. Best results with presently known reservoirs are believed to be obtainable with petroleum sulfonates having average equivalent weights in the range of about 325 to 500.

COSURFACTANTS

In accordance with this invention, phosphorus containing esters are used as cosurfactants. These phosphorus containing esters can be represented by the following structural formulas:

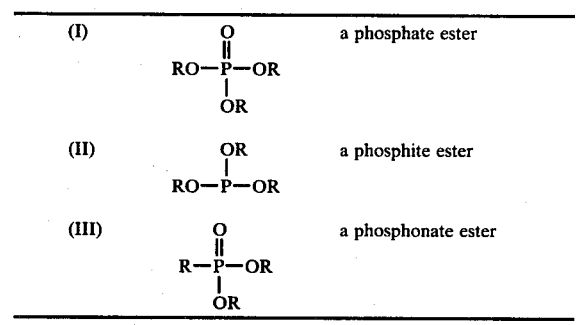

wherein R is either a methyl, ethyl or propyl group.

Representative examples of phosphate esters for use in the present invention include triethyl phosphate, trimethyl phosphate, tri-n-propyl phosphate, triisopropyl phosphate and mixtures thereof.

Representative examples of phosphite esters suitable for use in the present invention include trimethyl phosphite, triethyl phosphite, tri-n-propyl phosphite, triisopropyl phosphite, and mixtures thereof.

Representative examples of phosphonate esters useful in the present invention include trimethylphosphonate, triethylphosphonate, tri-n-propyl phosphonate, triisopropyl phosphonate and mixtures thereof.

Triethyl phosphate is the preferred ester for use in the present invention because of its commercial availability and its demonstrated effectiveness as a cosurfactant as shown in the example.

Whatever phosphate ester is used must, however, demonstrate some solubility or miscibility with water. Generally, the phosphate ester should have a water solubility of 0.1 to 20, preferably 1–10 weight percent.

It is contemplated that mixed cosurfactants such as the above cited phosphorus containing esters and alcohols containing 1 to 6 carbon atoms, such as isobutyl alcohol and isoamyl alcohol, can be used in the instant process.

OIL RECOVERY PROCESS

An oil recovery process using the surfactant system of this invention as defined above constitutes another embodiment of this invention. This process involves generally the conventional steps of post primary oil recovery and distinguishes over the known procedures primarily in the use of phosphate esters defined as co-surfactants.

PREFLUSH

It is optional to carry out a preflush step preceding the post-primary oil recovery operation. Such preflush operations are known in the art. Generally, a brine compatible with the surfactant system is injected via at least one injection well into the subterranean formation. Such a brine typically contains 2000–50,000 ppm salts, predominantly sodium chloride. Preferably a brine solution as utilized in the production of the surfactant system is also used in this preflush step.

The quantity of the preflush employed will generally be in a range of about 0.01 to 2, preferably 0.25 to 1 pore volume, based on the total pore volume of the formation or reservoir subjected to the recovery.

SURFACTANTFLOODING

After the optional preflush step the surfactant fluid of this invention is injected into the reservoir via at least one injection well. The surfactant system is injected in an amount usually in the range of about 0.001 to 1.0, preferably 0.01 to 0.25 pore volume based on the pore volume of the total treated and produced formation.

The preferred operation makes use of the aqueous saline surfactant system in the form of a single phase. Usually the surfactant system contains water, surfactant and the phosphorus containing cosurfactant as the principal ingredients. The single phase surfactant system is introduced into the formation via one or more injection wells and the generation of a microemulsion takes place in-situ as the injected surfactant system contacts the oil in place. It is contemplated that surfactant systems characterized by the presence of more than one phase are preferably subjected to continuous mixing during the injection operation.

The present invention can be utilized for a variety of subterranean reservoirs. The invention is, however, particularly preferred in reservoirs containing hard brine connate water. Such hard brines are characterized by a high content of $Mg^{++}$ and $Ca^{++}$ ions in the reservoir water. Typical hard brines contain more than 100 ppm of $Ca^{++}$ and/or $Mg^{++}$.

Protective agents are an especially preferred ingredient in the surfactant system of this invention when used for oil recovery from reservoirs with hard brines. They aid in solubilizing the surfactant in a high salinity environment. Examples for such protecting agents are polyethoxylated fatty alcohols and polyethoxylated alkylphenols. In addition, the sodium salts of sulfated polyethoxylated fatty alcohols and polyethoxylated alkylphenols are known in the art to function as protective agents.

MOBILITY BUFFER

Following the surfactant slug it is presently preferred, although again not necessary, to inject a mobility buffer solution into the reservoir. This buffer helps prevent fingering and enhances the efficiency of the oil recovery. Mobility buffer solutions are aqueous solutions of thickening agents. Examples of useful mobility buffers are aqueous and nonaqueous fluids containing mobility reducing agents such as high molecular weight partially hydrolyzed polyacrylamides, biopolysaccharides, cellulose ethers and the like. The mobility buffer contains 50 to 20,000, preferably 200 to 5,000 ppm of the mobility reducing agent in the fluid.

The injection of the mobility buffer fluid can be at a constant composition or the mobility buffer can be graded, i.e., the injection starts out at a relatively high concentration at the leading edge and the concentration tapers off toward the trailing edge. As an example, the mobility buffer can start with a concentration of 2500 ppm of polyacrylamide in the water and end with 250 ppm of polyacrylamide in water. These mobility buffer fluids are well known in the art.

The invention will be still more fully understood from the following detailed example which is intended for illustrative purposes only and not for an undue limitation of the scope of this invention.

EXAMPLE I

The following conditioning procedure was used in preparing the waterwet Berea sandstone cores for surfactantflooding.

Berea sandstone cores measuring approximately 3 feet in length and 3 inches in diameter were dried under vacuum for 24 hours at 250° F. Polycarbonate disc end plates with centrally located ⅛" threaded openings were secured to each end of the core with epoxy adhesive before applying an epoxy coating to the outside surface of the core. The epoxy coating material was formulated by mixing 550 g of a commercially available epoxy resin, 50 g of a suitable activator and 140 g diamaceous earth. This mixture was stirred until smooth before applying to the surface of the core. The cores were rotated continuously as the epoxy mixture was applied with a 2" paint brush. Four gauze strips measuring 2" × 12" were applied to the core in the following manner: a first gauze strip was applied to the core and covered with epoxy as the core was rotated; the remaining three strips were then individually incorporated in a similar manner. The core coating was cured over a period of about 4 hours at ambient temperature as the core was rotated. One-eighth inch male connector fittings were placed on each end of the core and pipe plug caps were put on the core.

The core was weighed to determine the dry weight before being saturated with brine of the desired concentration. A vacuum of about 1 mm was pulled on the core before saturating the core with approximately 1000 mL of brine. After saturation, approximately 100 to 200 mL of brine were pumped through the core before determining the original permeability to water. A 1 mL portion of effluent brine was collected from the saturated core and thereafter during a period of one minute, the volume of additional effluent collected and the pressure in psi were recorded. With these values the original permeability to water, e.g., on the order of 3.2 mL/min at 43 psi could be recorded. The pore volume of the core was calculated by the relationship:

$$\frac{\text{Brine Saturated Core Wt (g)} - \text{Dry Core Wt (g)}}{\text{Brine Density (g/mL)}} =$$

Core Pore Volume (mL)

The brine saturated core was oilflooded in the conventional manner until oil break-through became detectable by the presence of alternate globules of oil and water in the effluent line. The oilflood was carried out to completion by the 24 hour recycling of oil through the core to remove all of the displaceable water. The total water displaced, i.e., water displaced at the point of oil break-through and water displaced by the 24 hour recycle procedure was recorded as water displaced by oil flood. If desired, oil permeability was determined in a manner analogous to that used above for establishing original permeability to water. Prior to waterflood, the effluent line was air blown to remove oil.

The oilflooded core was waterflooded in the conventional manner until water break-through became detectable by the presence of alternate globules of oil and water in the effluent line. The waterflood was carried to completion by the 24 hour recycling of water through the core to remove all of the displaceable oil. The total oil displaced, i.e., oil displaced at the point of water break-through and oil displaced by the 24 hour recycle procedure was recorded as oil displaced by waterflood. If desired, water permeability after waterflood can be determined in a manner analogous to that used above for original permeability to water. The residual oil volume remaining in the core was calculated by subtracting the oil volume displaced by the waterflood from the water volume displaced by the oilflood. At this point, the core simulated an oil reservoir which had been exhaustively waterflooded. Cores were routinely conditioned in this manner prior to carrying out surfactantflood tests.

EXAMPLE II

This example demonstrates the effectiveness of a petroleum sulfonate/triethyl phosphate surfactant system in recovering waterflood residual oil from waterwet Berea sandstone cores. The surfactantflooding was carried out in the conventional manner of sequentially injecting the petroleum sulfonate/triethyl phosphate slug and a thickened aqueous mobility buffer slug of polyacrylamide graded back logarithmically with Arkansas-Burbank water.

The surfactant slug had the following composition:

| | |
|---|---|
| 8.71 g | Witco 10-410 (62 wt % active petroleum sulfonate) |
| 4.50 g | Triethyl phosphate |
| 5.25 g | Sodium chloride |
| 131.54 g | Arkansas-Burbank water |
| 150.000 g | Total composition |

Thus, each component was present in the following weight percentages:

| | |
|---|---|
| Petroleum sulfonate (active basis) | 3.6 wt % |
| Triethyl Phosphate | 3.0 wt % |
| Sodium chloride (optimal salinity) | 3.5 wt % |
| Arkansas-Burbank Water | 89.9 wt % |

The pore volume of the 3"×3' cylindrical Berea sandstone core was 812 mL. Since a 60.9 mL slug of the above surfactant composition was injected, the slug size expressed in terms of core pore volume was 7.5% PV. The surfactant slug was followed by 406 mL (0.5 PV) of Betz Hi Vis polyacrylamide (1800 ppm) in Arkansas-Burbank water.

In preparing the core, 560 mL of water was displaced from the water-saturated core by oilflood indicating the introduction of approximately 560 mL of oil into the core. Subsequent waterflood resulted in approximately 265 mL of oil being displaced from the core leaving approximately 295 mL of waterflood residual oil in the Berea sandstone core prior to the surfactantflood.

In the course of the surfactantflood, a total effluent of 2.08 pore volumes (ca. 1689 mL) was collected which contained 221.5 mL of tertiary oil representing 75% of the waterflood residual oil.

EXAMPLE III

This example demonstrates the effectiveness of a petroleum sulfonate/triethyl phosphate/isobutyl alcohol surfactant system in recovering waterflood residual oil from waterwet Berea sandstone cores. The surfactantflooding was carried out in the conventional manner of sequentially injecting the petroleum sulfonate/triethyl phosphate/isobutyl alcohol slug and a thickened aqueous mobility buffer slug of polyacrylamide graded back logarithmically with Arkansas-Burbank water.

The surfactant slug had the following composition:

| | |
|---|---|
| 8.71 g | Witco 10-410 (62 wt % active petroleum sulfonate) |
| 2.25 g | Triethyl phosphate |
| 2.25 g | Isobutyl alcohol |
| 3.00 g | Sodium chloride |
| 133.79 g | Arkansas-Burbank water |
| 150.00 g | Total composition |

Thus, each component was present in the following weight percentages:

| | |
|---|---|
| Petroleum sulfonate (active basis) | 3.6 wt % |
| Triethyl phosphate | 1.5 wt % |
| Isobutyl alcohol | 1.5 wt % |
| Sodium chloride (optimal salinity) | 2.0 wt % |
| Arkansas-Burbank water | 91.4 wt % |

The pore volume of the 3"×3' cylindrical Berea sandstone core was 789 mL. Since a 59.2 mL slug of the above surfactant composition was injected, the slug size expressed in terms of core pore volume was 7.5% PV. The surfactant slug was followed by 394.5 mL (0.5 PV) of Betz Hi Vis polyacrylamide (1800 ppm) in Arkansas-Burbank water.

In preparing the core, 545 mL of water was displaced from the water saturated core by oilflood indicating the introduction of approximately 545 mL of oil into the core. Subsequent waterflood resulted in approximately 251 mL of oil being displaced from the core leaving approximately 294 mL of waterflood residual oil in the Berea sandstone core prior to the surfactantflood.

In the course of the surfactantflood, a total effluent of 2.31 pore volumes (ca. 1823 mL) was collected which contained 245 mL of tertiary oil representing 83.3% of the waterflood residual oil.

EXAMPLE IV

This example describes some phase volume results obtained on equilibrating, respectively, aqueous saline surfactant systems comprising petroleum sulfonates and the inventive trialkyl phosphate ester cosurfactants with control systems comprising petroleum sulfonates and alkyl carboxylate ester cosurfactants. The phase volume experiments were carried out as described in U.S. Pat. No. 4,125,156.

The optimal salinity of the inventive petroleum sulfonate/triethyl phosphate system was found to be about 3.5 weight percent NaCl whereas an analogous ethyl acetate/petroleum sulfonate system exhibited an optimal salinity of 1.55 weight percent NaCl. This indicates that the inventive system would probably be significantly more effective in oil recovery at somewhat higher salinity than the analogous ethyl carboxylate ester system. This observation suggests also that phosphate ester cosurfactants, in general, might provide various aqueous saline surfactant systems exhibiting moderate to high optimal salinities. Such systems, of course, might be used advantageously in highly saline environments.

A further comparison was made between butyl acetate (ester cosurfactant) and triethyl phosphate ester cosurfactant because each cosurfactant contains six carbon atoms per molecule. Since the butyl acetate/petroleum sulfonate system exhibited no 3-phase region, the optimal salinity was not readily defined. As mentioned above, the petroleum sulfonate/triethyl phosphate system exhibited a 3-phase region and an optimal salinity of about 3.5 weight percent NaCl.

In some additional phase volume analysis work, it was observed that the inventive triethyl phosphate ester cosurfactant was compatible in admixture with the frequently used isobutyl alcohol (IBA) cosurfactant and the mixed cosurfactant systems exhibited somewhat higher optimal salinities than did a system in which IBA was the only cosurfactant. For example, at a total cosurfactant concentration of 3 weight percent in several surfactant systems, the IBA/petroleum sulfonate system (3.6 weight percent active sulfonate) exhibited an optimal salinity of about 1.8 weight percent of NaCl; as the IBA was "backed-out", respectively, with 1.0, 2.0 and 3.0 weight percent triethyl phosphate, the optimal salinity increased to 2.0 weight percent NaCl, 2.5 weight percent NaCl, and 3.5 weight percent NaCl. This suggests that the phosphate cosurfactant systems might be comparable or better in oil recovery under moderate to high salinity conditions than the conventionally used alcohol cosurfactants.

Reasonable variations and modifications which will become apparent to those skilled in the art can be made in this invention without departing from the spirit and scope thereof.

I claim:

1. A surfactant composition consisting essentially of:
   (a) a hydrocarbon sulfonate surfactant; and
   (b) a phosphorus containing ester cosurfactant selected from the group consisting of a phosphate ester represented by the formula

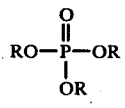

and a phosphite ester represented by the formula

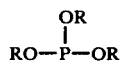

and a phosphonate ester represented by the formula

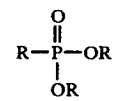

wherein R is either a methyl, ethyl or propyl group, wherein said surfactant is present in an amount from about 0.1-15 parts by weight and said cosurfactant is present in an amount from about 0.05-15 parts by weight and from 0.01-3 parts by weight of a polyethoxylated fatty alcohol, a polyethoxylated alkylphenol or a sodium salt of sulfated polyethoxylated alkylphenol as protective agent.

2. A surfactant composition according to claim 1 further comprising water in an amount of 100 parts by weight.

3. A surfactant according to claim 2 wherein NaCl is present in an amount up to 10 parts by weight.

4. A surfactant according to claim 3 wherein said cosurfactant is triethyl phosphate.

5. A process for hydrocarbon recovery from a subterranean formation comprising:
   (a) injecting a surfactant system comprising a hydrocarbon sulfonate surfactant and a phosphorus containing ester selected from the group consisting of a phosphate ester represented by the formula

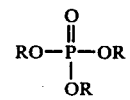

and a phosphite ester represented by the formula

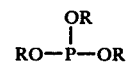

and a phosphonate ester represented by the formula

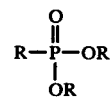

wherein R is either a methyl, ethyl or propyl group into said formation via at least one injection well, and
   wherein said surfactant is present in an amount of from about 0.10 to about 15 parts by weight and said cosurfactant is present in an amount from about 0.05-15 parts by weight thereby displacing the hydrocarbon present in said subterranean formation, and
   (b) thereafter recovering the displaced hydrocarbon from said subterranean formation.

6. A process in accordance with claim 5 wherein a mobility buffer is injected into said subterranean formation following the surfactant system.

7. A process in accordance with claim 6 wherein an aqueous drive fluid is injected into said subterranean formation following said mobility buffer fluid.

8. A process in accordance with claim 7 wherein said surfactant system further comprises a polyethoxylated fatty alcohol, a polyethoxylated alkylphenol or a sodium salt of sulfated polyethoxylated alkylphenol as protective agent and is injected into a subterranean formation containing hard brine.

9. A process in accordance with claim 8 wherein said surfactant system consists essentially of a petroleum sulfonate and triethyl phosphate.

* * * * *